March 18, 1969 C. R. HARPER 3,433,310
RIPPER TOOTH MOUNTING FOR EARTH-WORKING MACHINES
Filed April 25, 1966

INVENTOR.
CECIL R. HARPER
BY Wells & A.C. John
ATTYS.

March 18, 1969

C. R. HARPER 3,433,310

RIPPER TOOTH MOUNTING FOR EARTH-WORKING MACHINES

Filed April 25, 1966

INVENTOR.
CECIL R. HARPER
BY *Wells & St John*
ATTYS.

March 18, 1969  C. R. HARPER  3,433,310
RIPPER TOOTH MOUNTING FOR EARTH-WORKING MACHINES
Filed April 25, 1966 Sheet 3 of 3
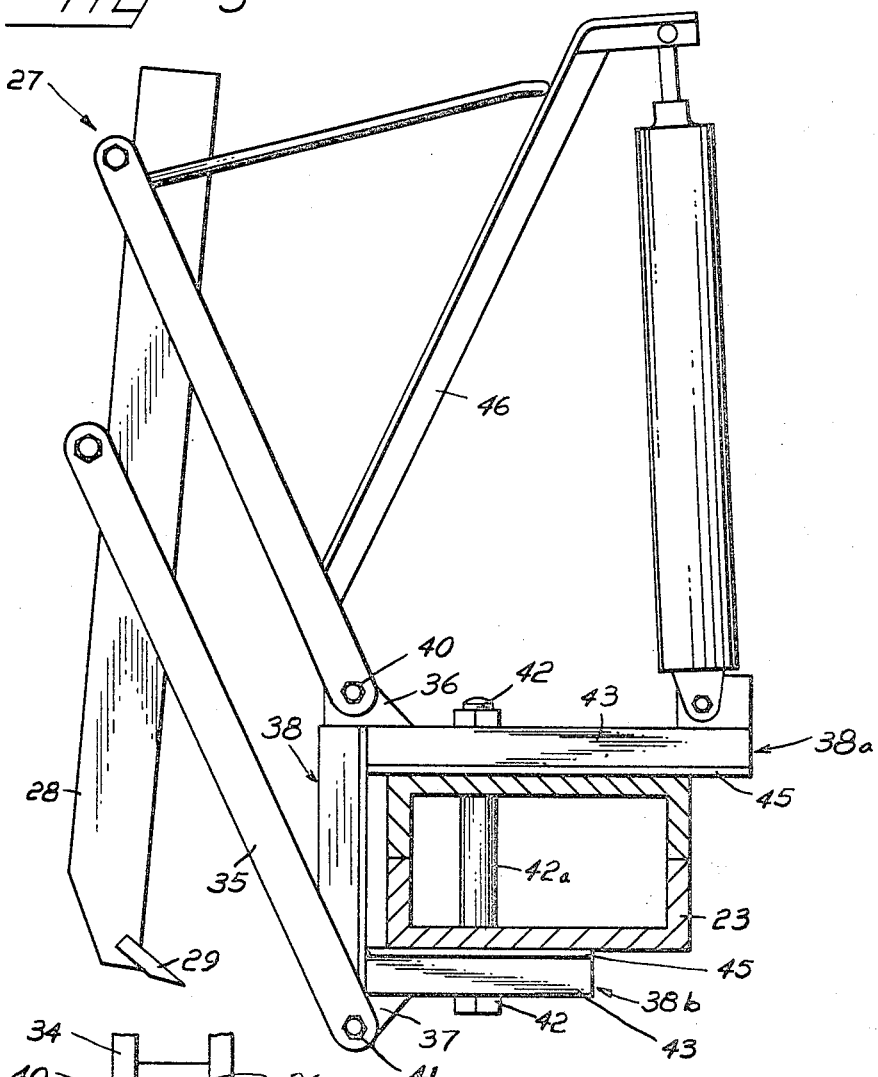
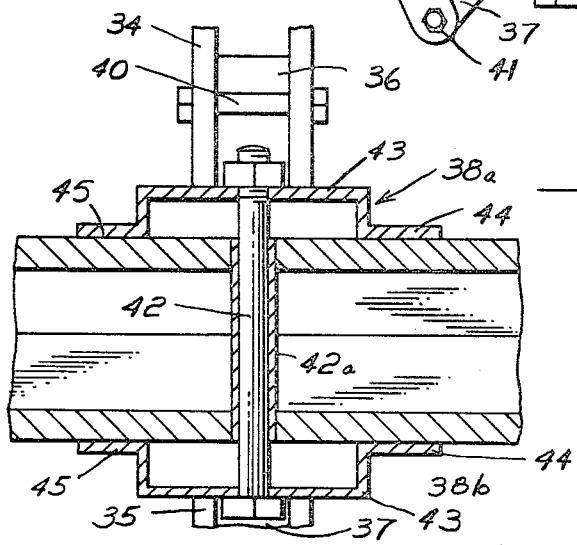
INVENTOR.
CECIL R. HARPER
BY Wells & St John
ATTYS.

United States Patent Office 3,433,310
Patented Mar. 18, 1969

3,433,310
RIPPER TOOTH MOUNTING FOR EARTH-WORKING MACHINES
Cecil R. Harper, E. 8525½ Main,
Spokane, Wash. 99206
Filed Apr. 25, 1966, Ser. No. 544,882
U.S. Cl. 172—471                                                4 Claims
Int. Cl. A01b 63/108, 13/08

ABSTRACT OF THE DISCLOSURE

A ripper tooth attachment for an earth working machine embodies a cross bar with means to secure it to the machine so that the cross bar is held in a horizontal position and extends transverse to the direction of travel of the machine. A plurality of clevises are mounted to the cross bar and spaced apart along the bar. Each clevis has a pair of vertically spaced parallel yokes pivoted thereon and extending rearwardly therefrom. An upright ripper tooth is pivoted to the free ends of each pair of yokes so it can be raised and lowered while maintaining its upright position. Each clevis has an individually operable hydraulic jack thereon connected to the upper yoke carried by that clevis to raise and lower the yokes and thus individually control the level of each one of the several yokes. Individual control lines extend from each jack to a control unit on the machine.

---

This invention is directed toward an improved mounting for ripper teeth used on earth working machines such as graders, bulldozers, scrapers etc. It is the principal purpose of this invention to provide a ripper tooth mounting attachment for such machines, which attachment has a plurality of ripper teeth mounted thereon in spaced relation crosswise of the direction of travel, the attachment having means individual to each tooth for raising and lowering the tooth, which means can be controlled from the machine.

In machines having ripper teeth with which I have been familiar, the teeth have usually been upon a movable frame when more than one tooth was provided as in the Launder U.S. Patent 3,116,797. Or they were provided as a part of the operating blade as in the Hoxie U.S. Patent 2,993,285. According to my improvement, the attachment provides a plurality of teeth, each mounted to move up and down while maintaining its angle of attack the same. These teeth are so mounted that they can swing a limited amount and follow the pulling implement with a minimum of side strain. The teeth can be used at various levels all together or one at a time. When inactive, they are positioned so as to be closer to their mounting on the machine than when they are lowered to dig.

The nature and advantages of the invention will appear more fully from the following description and the accompanying drawings. It should be understood, however, that the drawings and description are illustrative only and are not intended to limit the scope of my invention except as it is limited by the claims. The drawings and description show the preferred form of my invention.

In the drawings:

FIGURE 5 is an enlarged sectional view taken on the line 5—5 of FIGURE 2 showing the lifted transport of position of the ripper tooth; and FIGURE 6 is an enlarged fragmentary sectional view taken on the line 6—6 of FIGURE 1.

Figure 1:
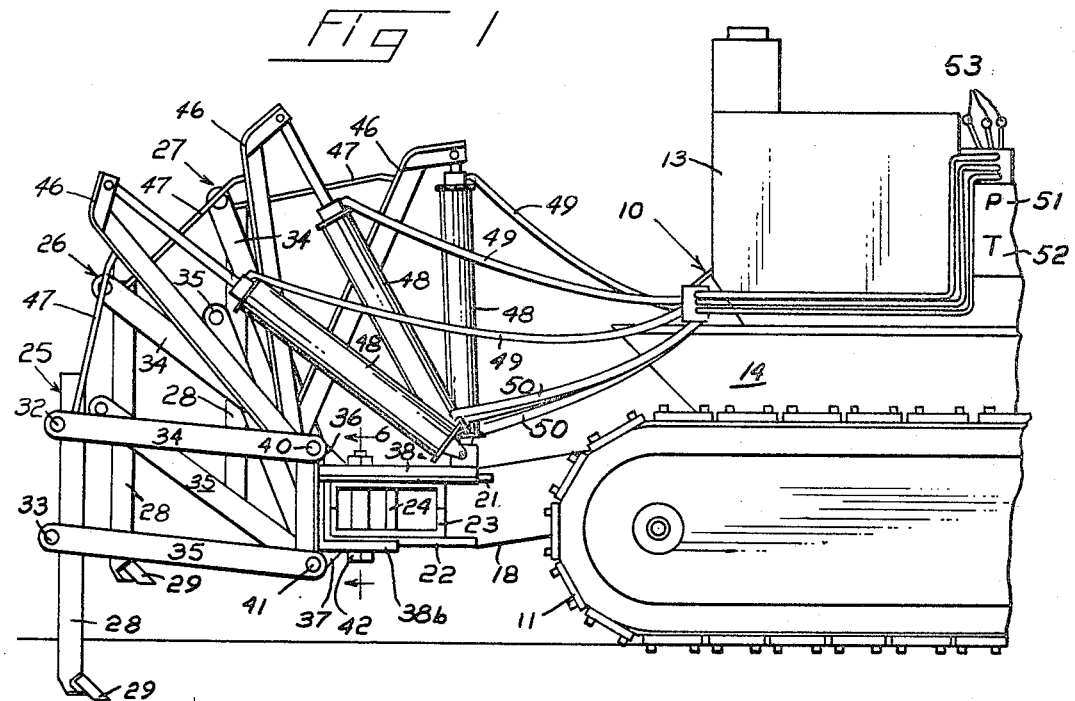
FIGURE 1 is a side view of the rear portion of an earth working machine with my ripper tooth mounting attachment secured thereon.

Referring now to the drawings, my invention is shown as an attachment to an earth working machine wherein the motive power is a crawler type tractor 10. The tracks of the tractor are indicated at 11 and 12. The machine includes as part of its frame a pair of plates 14 and 15 which support the cab on the rear axle assembly 16 of the machine. A cross frame member 17 connects the lower portions of the plates 14 and 15.

My attachment utilizes a pair of supports 18 and 19 which are bolted to the plates 14 and 15 respectively. Each support has a brace 20 which is welded to the support and is bolted to the cross frame 17. The supports 18 and 19 project away from the machine 10 and, at their rear ends, each support is provided with mounting projections 21 and 22 adjusted to receive a hollow cross bar 23. Bolts 24 secure the cross bar 23 to the projections 21 and 22.

The cross bar 23 is used to support a plurality of ripper tooth operating assemblies 25, 26 and 27. These assemblies are alike so a description of one will be given. Each ripper tooth assembly includes a ripper tooth bar 28 with a bit 29 at its lower end. The bar 28 is rectangular in cross section. It has two bearing members 30 and 31 fixed thereon along the back edge. The members 30 and 31 have pivot bolts 32 and 33 through them. These bolts mount lift yokes 34 and 35 which extend forward to a pair of ears 36 and 37 on the back portion of a mounting clevis 38. Pivot bolts 40 and 41 connect the yokes 34 and 35 to the ears 36 and 37. With this arrangement the ripper tooth bar 28 can be moved up and down while the angle of attack of the bit 29 is kept the same regardless of depth.

The clevis 38 receives the hollow cross bar 23 therein. A pivot bolt 42 secures the clevis in place. A sleeve 42a is mounted in the cross bar 23 to form a bearing for the bolt 42 because the clevis is free to turn a limited amount relative to the cross bar 23 to allow the tooth assemblies some angular movement when the machine is turning as it advances. The top and bottom members 38a and 38b of the clevis 38 are made with a raised center portion 43 and spaced bearing portions 44 and 45 which bear on the cross bar 23 and oppose tipping of the ripper tooth assembly.

The control and operating means for holding the ripper tooth bit 29 at the desired height and for changing this height comprises a bar 46 mounted on the upper yoke 34 and extending diagonally away from the yoke and brace means 47, between the upper portion of the bar 46 and the rear end of the yoke 34. A hydraulic jack 48 is connected between the front end of the top member 38a of the clevis 38. Hydraulic fluid tubes 49 and 50 control the supply of fluid to the jack 48 from a pump 51 and tank 52 on the machine 10 through control valves 53. The details of the pump 51, tank 52 and valves 53 are conventional and are not shown.

Figure 2:
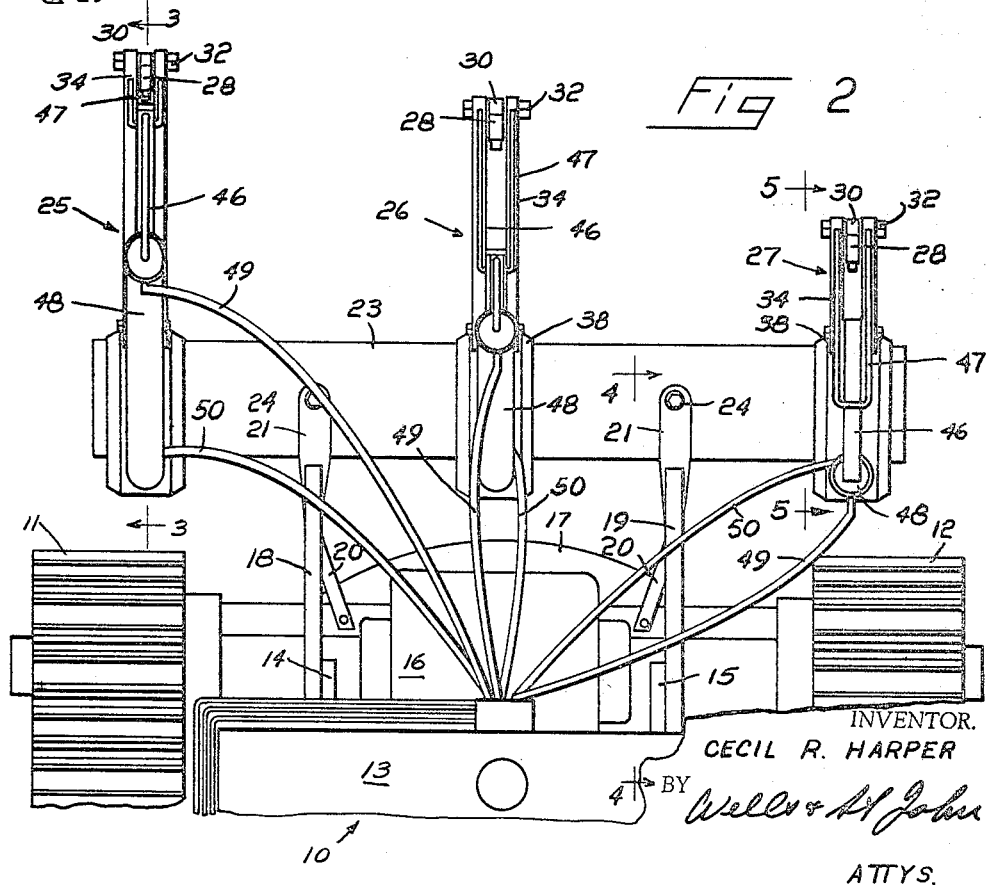
FIGURE 2 is a plan view of the rear end of the machine and the attachment.
Figure 3:
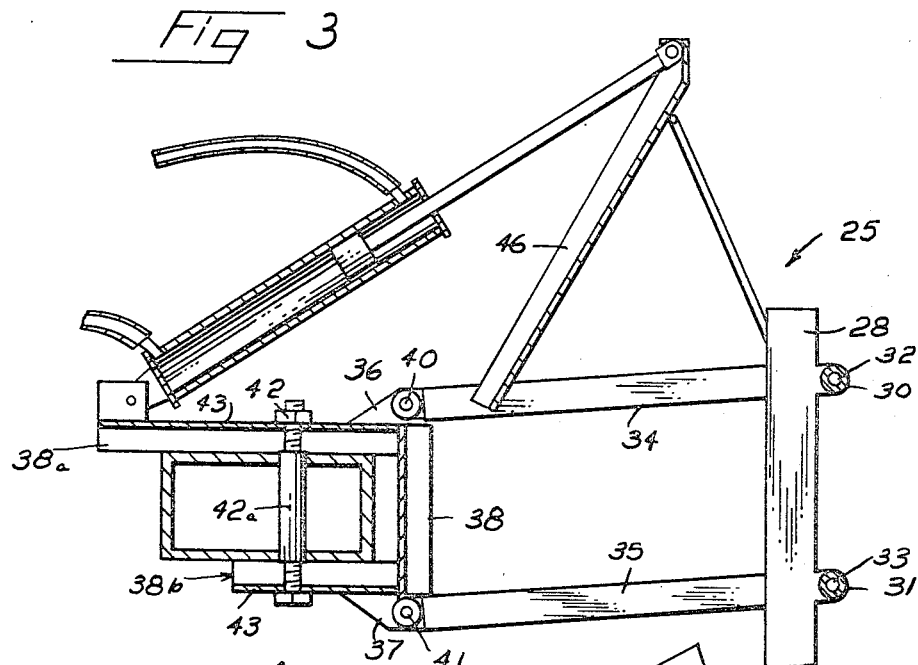
FIGURE 3 is a sectional view on an enlarged scale, taken on the line 3—3 of FIGURE 2.
Figure 4:
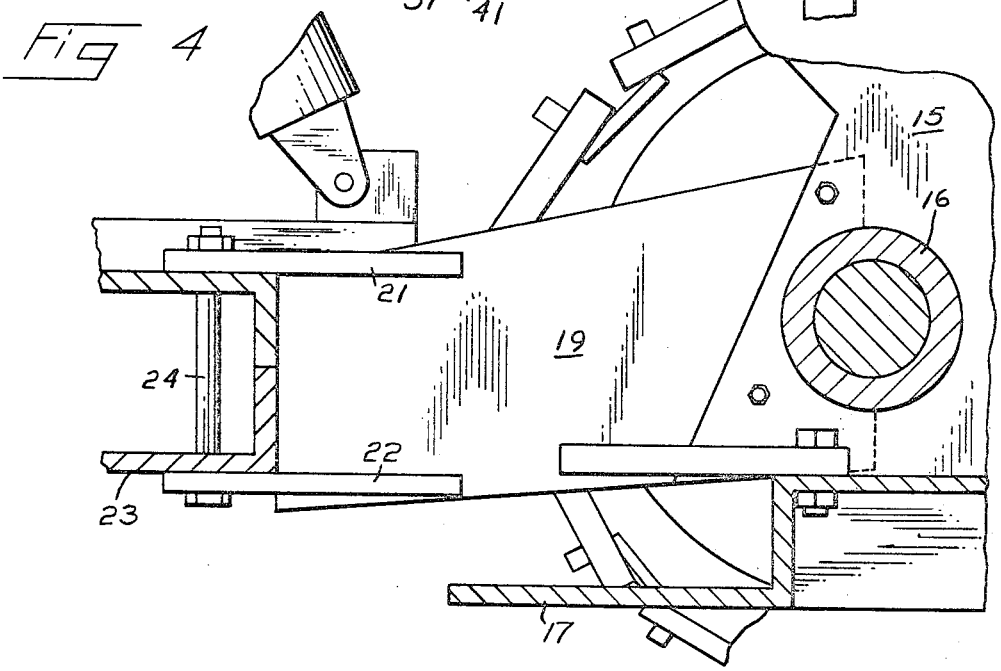
FIGURE 4 is an enlarged fragmentary sectional view taken on the line 4—4 of FIGURE 2.

It will be appreciated that by providing a series of apertures in the bar 23 with sleeves 42a as indicated in FIGURE 2 of the drawings the several ripper tooth assemblies can be adjusted lengthwise of the bar 23. The mounting of all of the parts necessary to control a single ripper tooth upon the clevis 38 or its equivalent enables me to use any one or all of the ripper teeth with each tooth set individually to the desired depth. All parts of the ripper tooth mechanism except the fluid lines are mounted on the cross bar 23 which can be attached to an earth working machine very readily.

It is believed that the nature and advantage of my invention will be clear to those skilled in the art from the foregoing description. The invention is defined in the following claims.

I claim:
1. A ripper tooth attachment for earth working machines, comprising:
  a cross bar;
  supports for said cross bar having means thereon for securement to an earth moving machine to hold and support the cross bar in a horizontal position transverse to the direction of travel of the earth working machine; and
  a plurality of independent ripper tooth operating assemblies mounted on the cross bar at laterally spaced location, each of said operating assemblies comprising;
  a clevis securely mounted to the cross bar;
  a ripper tooth located rearward of the clevis for engaging the earth;
  a parallel yoke frame pivotally interconnecting the clevis and the ripper tooth to support the tooth for up and down pivotal movement relative to the cross bar while maintaining the ripper tooth upright; and
  a hydraulic jack mounted on the clevis and operatively connected to the parallel yoke frame to independently raise and lower the ripper tooth with respect to the other ripper teeth.

2. The invention defined in claim 1 wherein the clevises have limited pivotal movement in a horizontal direction on said cross bar.

3. The invention defined in claim 1 wherein the cross bar has mountings for said clevises at many positions throughout its length so that a clevis may be adjusted closer to or farther from an adjacent clevis.

4. The invention defined in claim 1 wherein each clevis has a pivot bolt through the cross bar; and
  each clevis has bearing surfaces spaced lengthwise of the cross bar from its pivot pin to restrain tipping of the ripper tooth.

References Cited

UNITED STATES PATENTS

| | | | |
|---|---|---|---|
| 1,294,902 | 2/1919 | Harris | 172—471 |
| 2,593,679 | 4/1952 | Kaupke | 172—464 |
| 2,651,248 | 9/1953 | Ballu | 182—471 |
| 3,116,797 | 1/1964 | Launder et al. | 172—699 XR |

ABRAHAM G. STONE, *Primary Examiner.*

JAMES W. PETERSON, *Assistant Examiner.*

U.S. Cl. X.R.

172—464, 699